(12) United States Patent
Matsumoto et al.

(10) Patent No.: US 9,322,696 B2
(45) Date of Patent: Apr. 26, 2016

(54) APPARATUS FOR MEASURING LEVEL OF MOLTEN METAL AND METHOD FOR MEASURING LEVEL OF MOLTEN METAL

(71) Applicant: NIRECO CORPORATION, Tokyo (JP)

(72) Inventors: Koichi Matsumoto, Tokyo (JP); Yasumasa Kato, Tokyo (JP)

(73) Assignee: NIRECO CORPORATION, Tokyo (JP)

( * ) Notice: Subject to any disclaimer, the term of this patent is extended or adjusted under 35 U.S.C. 154(b) by 102 days.

(21) Appl. No.: 14/100,108

(22) Filed: Dec. 9, 2013

(65) Prior Publication Data

US 2014/0091221 A1    Apr. 3, 2014

Related U.S. Application Data

(63) Continuation of application No. PCT/JP2011/003622, filed on Jun. 24, 2011.

(51) Int. Cl.
*G01F 23/284* (2006.01)
*B22D 2/00* (2006.01)
*B22D 11/16* (2006.01)
*B22D 11/18* (2006.01)

(52) U.S. Cl.
CPC ............ *G01F 23/2845* (2013.01); *B22D 2/003* (2013.01); *B22D 11/16* (2013.01); *B22D 11/186* (2013.01); *G01F 23/284* (2013.01)

(58) Field of Classification Search
CPC ... G01F 23/2845; G01F 23/284; B22D 2/003; B22D 11/16; B22D 11/186
USPC ............................................ 250/357.1, 336.1
See application file for complete search history.

(56) References Cited

U.S. PATENT DOCUMENTS

| 2,435,615 | A | * | 2/1948 | Varian et al. ................... 342/111 |
| 4,369,449 | A | * | 1/1983 | MacDougall .................. 343/790 |
| 4,580,449 | A | | 4/1986 | Hatono et al. |

(Continued)

FOREIGN PATENT DOCUMENTS

| EP | 0 444 834 A2 | 9/1991 |
| EP | 0570140 A1 | 11/1993 |

(Continued)

OTHER PUBLICATIONS

International Search Report dated Oct. 4, 2011 corresponding to International Patent Application No. PCT/JP2011/003622 and English translation thereof.

(Continued)

*Primary Examiner* — David Porta
*Assistant Examiner* — Blake Riddick
(74) *Attorney, Agent, or Firm* — Squire Patton Boggs (US) LLP

(57) ABSTRACT

Provided is an apparatus for measuring a level of molten metal which has a simple structure and is highly robust against a change in level at a local portion of the surface of molten metal. The apparatus for measuring a level of molten metal according to a first aspect of the present invention is an apparatus which measures a level of molten metal in a mold. The apparatus includes an omnidirectional transmitting antenna; an omnidirectional receiving antenna; and a signal processor. The apparatus measures the level of molten metal in the mold using electromagnetic wave in ultra-high frequency range emitted into the mold by the omnidirectional transmitting antenna.

7 Claims, 8 Drawing Sheets

(56) References Cited

U.S. PATENT DOCUMENTS

| | | | | |
|---|---|---|---|---|
| 5,075,863 | A | * | 12/1991 | Nagamune et al. ............ 702/159 |
| 5,233,352 | A | | 8/1993 | Cournane |
| 5,507,854 | A | * | 4/1996 | Yamada ............... B22D 11/201 |
| | | | | 164/151.3 |
| 6,094,174 | A | * | 7/2000 | Knop et al. ................ 343/781 R |
| 6,662,649 | B1 | * | 12/2003 | Knight et al. ............... 73/290 V |
| 7,367,226 | B2 | * | 5/2008 | Okamura .................... 73/64.55 |
| 2005/0156607 | A1 | | 7/2005 | Okamura |
| 2007/0230639 | A1 | * | 10/2007 | Stirling-Gallacher ........ 375/347 |

FOREIGN PATENT DOCUMENTS

| | | |
|---|---|---|
| EP | 2 090 387 A1 | 8/2009 |
| GB | 2120490 A | 11/1983 |
| JP | 58-022922 A | 2/1983 |
| JP | 58-150826 A | 9/1983 |
| JP | 61-068520 A | 4/1986 |
| JP | 01-145527 A | 6/1989 |
| JP | 6-50793 A | 2/1994 |
| JP | 2000-310554 A | 11/2000 |
| JP | 2005-034886 A | 2/2005 |
| WO | WO 2005/064290 A2 | 7/2005 |
| WO | WO 2010/094139 A1 | 8/2010 |

OTHER PUBLICATIONS

Supplementary European Search Report dated Apr. 23, 2015 corresponding to European Patent Application No. 11868128.7.

\* cited by examiner

APPARATUS FOR MEASURING LEVEL OF MOLTEN METAL AND METHOD FOR MEASURING LEVEL OF MOLTEN METAL

CROSS REFERENCE TO RELATED APPLICATION

This is a Continuation of International Patent Application No. PCT/JP2011/003622 filed Jun. 24, 2011, which designates the U.S. and was published under PCT Article 21(2) in English. The contents of this application is hereby incorporated by reference.

TECHNICAL FIELD

The present invention relates to an apparatus for measuring a level of molten metal and a method for measuring a level of molten metal using electromagnetic wave.

BACKGROUND ART

Continuous casting is a process in which molten metal is continuously poured into a mold, cooled and made to solidify in order to supply a molded piece in a predetermined shape.

Apparatuses for measuring a level of molten metal in the mold using electromagnetic waves have been proposed (Patent Documents 1 to 3). Such conventional electromagnetic-wave-type apparatuses use highly directional electromagnetic waves in order to reduce effect of electromagnetic waves reflected on objects besides a surface of molten metal (line 16 in the upper and right-hand column on page 2 to line 3 in the lower and left-hand column on the same page of Patent Document 1 and paragraph [0037] of Patent Document 3). There also exists one provided with radio wave absorbing members on walls of the mold or the like for the purpose of anti-reflection (lines 2 to 9 in the lower and right-hand column on page 2 of Patent Document 2). Further, in conventional methods in which electromagnetic waves are used, electromagnetic waves of frequency which is 10 GHz or higher are used to downsize antennas for highly directional electromagnetic waves (lines 6 to 11 in the upper and right-hand column on page 3 of Patent Document 1 and paragraph [0019] of Patent Document 3).

However, electromagnetic wave of a higher frequency produces a large loss in signal through cable and is difficult to handle. Additionally, electromagnetic wave of a higher frequency requires an apparatus which is complicated in structure and expensive. Further, when highly directional electromagnetic wave is used, a change in level at a local portion of the surface of the molten metal affects measurement of a level of molten metal to an excessive degree, and therefore an apparatus for measuring a level of molten metal which is highly robust against a change in level at a local portion of the surface of the molten metal cannot be obtained. Thus, conventional apparatuses for measuring a level of molten metal are complicated in structure, expensive and poorly robust against a change in level at a local portion of the surface of the molten metal.

PRIOR ART DOCUMENTS

Patent Documents

Patent Document 1: JP58-022922A
Patent Document 2: JP61-068520A
Patent Document 3: JP2005-034886A Accordingly, there is a need for an apparatus for measuring a level of molten metal which has a simple structure and is highly robust against a change in level at a local portion of a surface of molten metal.

SUMMARY OF INVENTION

An apparatus for measuring a level of molten metal according to a first aspect of the present invention is an apparatus which measures a level of molten metal in a mold. The apparatus includes an omnidirectional transmitting antenna; an omnidirectional receiving antenna; and a signal processor. The apparatus measures the level of molten metal in the mold using electromagnetic wave in ultra-high frequency range emitted into the mold by the omnidirectional transmitting antenna.

Since the apparatus for measuring a level of molten metal according to the present aspect uses electromagnetic wave in ultra-high frequency range (300 MHz to 3 GHz), the structure of the apparatus is more simple compared with that of an apparatus using electromagnetic wave of a higher frequency. Further, since the apparatus for measuring a level of molten metal according to the present invention uses omnidirectional antennas, the apparatus is highly robust against a change in level at a local portion of a surface of the molten metal. In the apparatus for measuring a level of molten metal according to the present aspect, a level of molten metal is measured by sending electromagnetic wave into a space which is surrounded by the wall surfaces of the mold and the surface of molten metal and the upper side alone of which is not closed and by using the electromagnetic wave reflected on the surface of molten metal.

In an apparatus for measuring a level of molten metal according to a first embodiment of the present invention, the transmitting antenna and the receiving antenna are installed at a level which is higher than a surface of molten metal such that they are opposite each other in a plane which is parallel to the surface of molten metal.

According to the present embodiment, electromagnetic wave can be sent into a space which is surrounded by the wall surfaces of the mold and the surface of molten metal and the upper side alone of which is not closed and the electromagnetic wave reflected on the surface of molten metal can be received, using the transmitting antenna and the receiving antenna which are installed at a level which is higher than the surface of molten metal such that they are opposite each other in a plane which is parallel to the surface of molten metal.

An apparatus for measuring a level of molten metal according to a second embodiment of the present invention is constructed such that the apparatus uses electromagnetic waves of two kinds of frequencies in ultra-high frequency range.

According to the present embodiment, even when carrier wave of one of the two kinds of frequencies forms a node of the standing wave in the vicinity of the receiving antenna and therefore signal of the electromagnetic wave becomes smaller, measurement can be performed using carrier wave of the other frequency.

An apparatus for measuring a level of molten metal according to a third embodiment of the present invention is constructed such that the apparatus measures the level of molten metal in the mold by detecting a phase difference between electromagnetic wave transmitted by the transmitting antenna and electromagnetic wave received by the receiving antenna.

According to the present embodiment, a level of the surface of molten metal can be measured with a higher accuracy using a phase difference between the transmitted electromagnetic wave and the received electromagnetic wave. Further, in the present invention, electromagnetic wave in ultra-high frequency range, which has a frequency lower than frequencies used in conventional apparatuses. This advantageously enlarges a range of distance in which distance can be uniquely determined through a phase difference of electromagnetic wave.

An apparatus for measuring a level of molten metal according to a fourth embodiment of the present invention is constructed such that signal to be emitted by the transmitting antenna is modulated by a pseudo-random signal of frequency $f_1$, signal received by the receiving antenna is demodulated a pseudo-random signal of frequency $f_2$ ($f_2<f_1$) which has the identical pattern and measurement of the level of molten metal is performed in each measurement cycle period $T_B$ which is determined by $$T_B = N/(f_{M1} - f_{M2})$$

where N represents wave number in a period of the pseudo-random signals.

In the apparatus for measuring a level of molten metal according to the present embodiment, the propagation time τ is increased in time by a factor of $f_{M1}/(f_{M1}-f_{M2})$ so that measurement is facilitated. Further, the use of modulation and demodulation of pseudo-random signals allows remarkable reduction of influence of noise.

An apparatus for measuring a level of molten metal according to a fifth embodiment of the present invention is the apparatus for measuring a level of molten metal according to the fourth embodiment and is constructed such that the apparatus alternately uses electromagnetic waves of two kinds of frequencies by switching for each measurement cycle period $T_B$.

The apparatus for measuring a level of molten metal according to the present embodiment alternately uses electromagnetic waves of two kinds of frequencies by switching for each measurement cycle period $T_B$, and therefore stable measurement can be performed regardless of positions of nodes of the standing wave.

A method for measuring a level of molten metal according to a second aspect of the present invention is a method for measuring a level of molten metal by which level of molten metal in a mold is measured. The method includes the steps of; emitting electromagnetic wave in ultra-high frequency range by an omnidirectional transmitting antenna; receiving electromagnetic wave reflected on a surface of molten metal by an omnidirectional receiving antenna; and processing a signal of the electromagnetic wave emitted by the omnidirectional transmitting antenna and a signal of the electromagnetic wave received by the omnidirectional receiving antenna to obtain the level of molten metal.

Since the method for measuring a level of molten metal according to the present aspect uses electromagnetic wave in ultra-high frequency range (300 MHz to 3 GHz), the structure of the apparatus is more simple compared with that of an apparatus using electromagnetic wave of a higher frequency. Further, since the method for measuring a level of molten metal according to the present invention uses omnidirectional antennas, the method is highly robust against a change in level at a local portion of a surface of the molten metal. In the method for measuring a level of molten metal according to the present aspect, a level of molten metal is measured by sending electromagnetic wave into a space which is surrounded by the wall surfaces of the mold and the surface of molten metal and the upper side alone of which is not closed and by using the electromagnetic wave reflected on the surface of molten metal.

DESCRIPTION OF EMBODIMENTS

Figure 1:
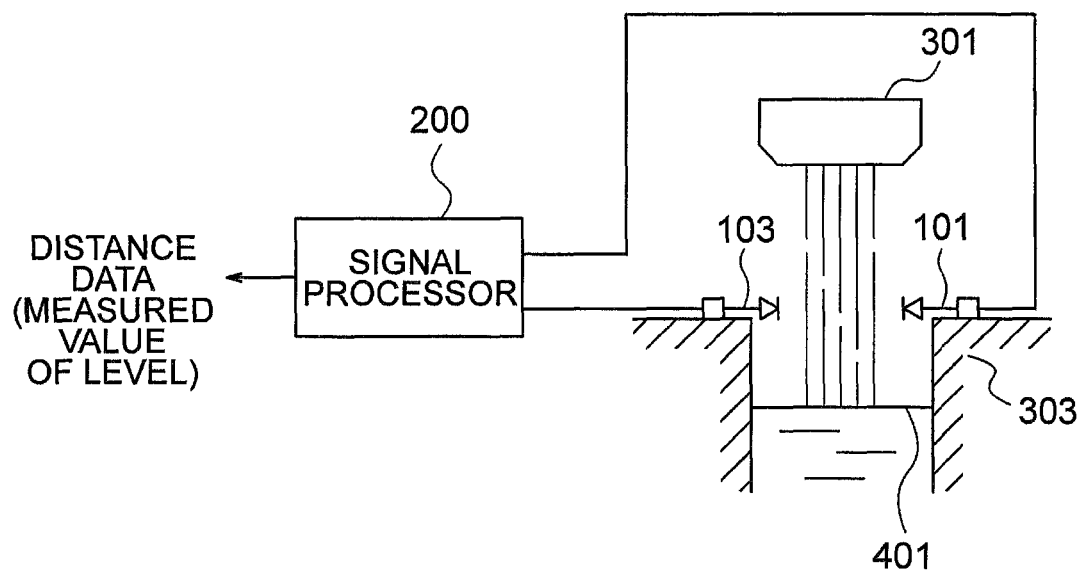
FIG. 1 shows a configuration diagram of an apparatus for measuring a level of molten metal according to an embodiment of the present invention.

FIG. 1 shows a configuration diagram of an apparatus for measuring a level of molten metal according to an embodiment of the present invention.

Molten metal stored in a tundish 301 is poured into a mold 303, made to solidify in the mold 303 and delivered from the mold 303. When in a certain time period an amount of molten metal which is poured thereinto is greater than an amount of metal which is delivered therefrom, a level of a surface 401 of the molten metal in the mold 303 goes up. On the other hand, when in a certain time period an amount of molten metal which is delivered therefrom is greater than an amount of metal which is poured thereinto, the level of the surface 401 of the molten metal in the mold 303 goes down. Under the above-described situation, the apparatus for measuring a level of molten metal according to the present embodiment measures the level of the surface 401 of the molten metal in the mold.

The apparatus for measuring a level of molten metal according to the present embodiment is provided with a transmitting antenna 101, a receiving antenna 103 and a signal processor 200. In the present embodiment, the transmitting antenna 101 and the receiving antenna 103 are installed on the upper surface of the mold 303 such that they are opposite each other in a horizontal plane. The signal processor 200 generates transmission signal and sends it to the transmitting antenna 101. The transmitting antenna 101 emits the transmission signal of electromagnetic wave. The receiving antenna 103 receives the electromagnetic wave which has been emitted into the mold 303 and reflected on the surface 401 of molten metal as reception signal and sends it to the signal processor 200. The signal processor 200 processes the transmission signal and the reception signal to obtain data of distance between the upper surface of the mold and the surface 401 of the molten metal in the mold 303, that is, a level of the surface 401 of the molten metal in the mold 303. The signal processor 200 will be described in detail later.

The inventors have obtained a new finding that a position of a surface 401 of molten metal can be determined by sending electromagnetic wave into a space which is surrounded by the wall surfaces of the mold 303 and the surface 401 of molten metal and the upper side alone of which is not closed and by measuring the electromagnetic wave reflected on the surface 401 of molten metal.

In conventional methods using electromagnetic waves, highly directional electromagnetic wave is sent toward a surface of molten metal, and a position of the surface is determined by measuring the electromagnetic wave reflected on the surface. Those skilled in the art have had an idea that use of highly directional electromagnetic wave advantageously contributes to a higher SN ratio (a signal to noise ratio). For this reason, those skilled in the art have never thought of sending electromagnetic wave into the space which is surrounded by the wall surfaces of the mold 303 and the surface 401 of molten metal and the upper side alone of which is not closed and utilizing the electromagnetic wave reflected on the surface 401 of molten metal. Even if they had thought of it, the idea would not have been studied to a sufficient extent because there existed the preconceived idea that a sufficient SN ratio cannot be obtained. As a result, the above-described new finding that a position of a surface 401 of molten metal can be determined by sending electromagnetic wave into the space which is surrounded by the wall surfaces of the mold 303 and the surface 401 of molten metal and the upper side alone of which is not closed and by measuring the electromagnetic wave reflected on the surface 401 of molten metal, has never been obtained.

The measuring principle based on the inventors' new finding differs in the following points from the method based on the conventional idea that highly directional electromagnetic wave is emitted toward a surface of molten metal and the highly directional electromagnetic wave reflected thereon is measured.

First, electromagnetic wave is sent into a space which is surrounded by the wall surfaces of the mold 303 and the surface 401 of molten metal and the upper side alone of which is not closed, and the electromagnetic wave reflected on the surface 401 of molten metal is utilized. Accordingly, there is no need to use highly directional electromagnetic wave to be directed toward a specific object. In other words, omnidirectional electromagnetic wave can be used. This feature will be described based on experimental results later.

Second, since omnidirectional electromagnetic wave is used, there is no need to increase the frequency of the electromagnetic wave for the purpose of downsizing the antenna. Accordingly, electromagnetic wave in ultra-high frequency range (300 MHz to 3 GHz) can be used.

Figure 2:
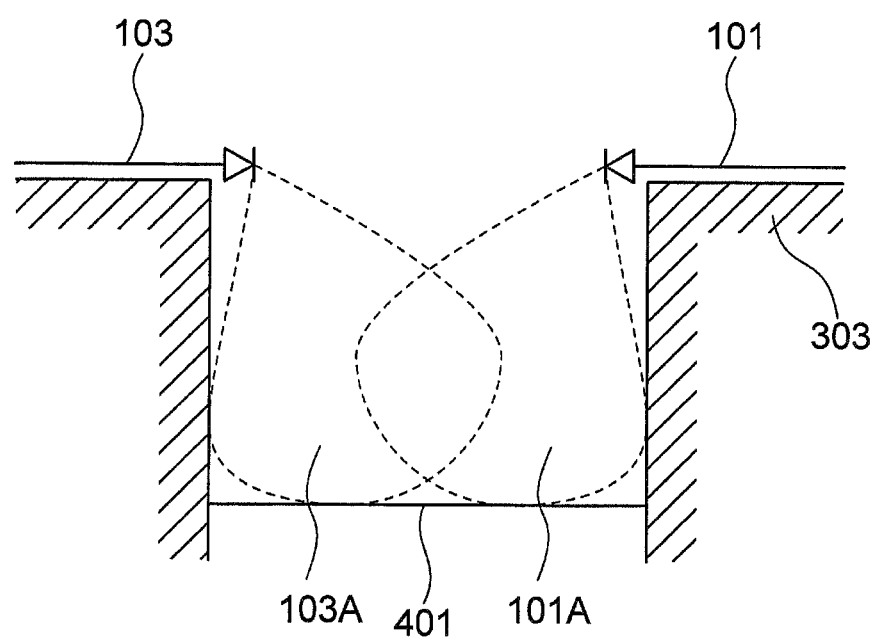
FIG. 2 shows relationships between the transmitting antenna, the receiving antenna, the space which is surrounded by the wall surfaces of the mold and the surface of molten metal and the upper side alone of which is not closed.

FIG. 2 shows relationships between the transmitting antenna 101, the receiving antenna 103, and the space which is surrounded by the wall surfaces of the mold 303 and the surface 401 of molten metal and the upper side alone of which is not closed. FIG. 2 conceptually shows a range of electromagnetic wave emitted by the transmitting antenna 101 and a range of electromagnetic wave received by the receiving antenna 103.

Figure 3:
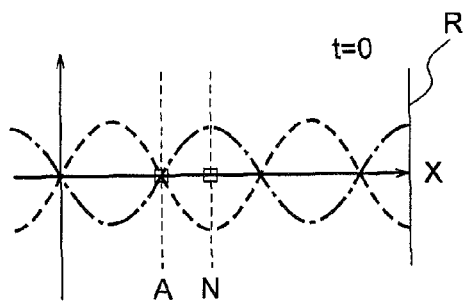
FIG. 3 illustrates standing wave.
Figure 3:
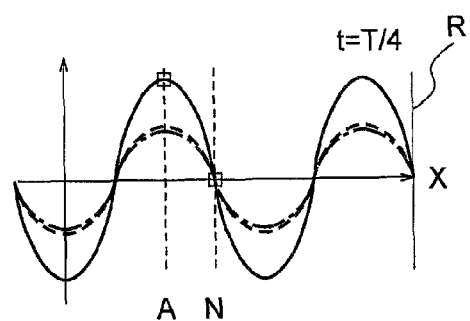
Figure 3:
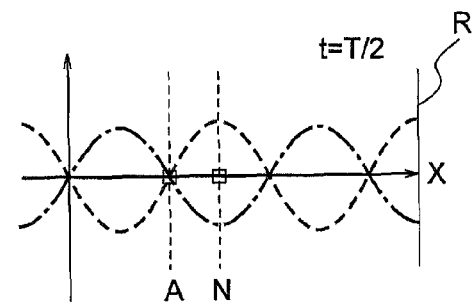
Figure 3:
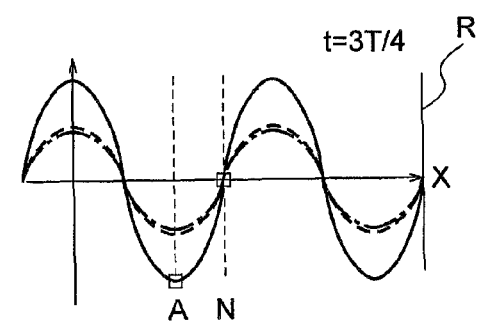

FIG. 3 illustrates standing wave. In FIG. 3, travelling wave is represented by a dotted line, reflected wave is represented by an alternate long and short dashed line, and standing wave is represented by a solid line. "T" represents a period of the travelling wave and the reflected wave. "t" represents a lapse of time. The travelling wave is reflected on a reflection plane R and the reflected wave is generated. The travelling wave and the reflected wave interfere with one another to form the standing wave. Positions of anti-nodes (A) and positions of nodes (N) of the standing wave remain unchanged with a lapse of time. Positions of anti-nodes (A) and positions of nodes (N) of the standing wave are determined by the period T (frequency of the transmitted electromagnetic wave) and the position of the reflection plane. In the present embodiment, the surface 401 of molten metal corresponds to the reflection plane R.

When electromagnetic wave is sent to the space which is surrounded by the wall surfaces of the mold 303 and the surface 401 of molten metal and the upper side alone of which is not closed, standing wave is formed while the surface 401 of molten metal serves as the reflection plane R. Positions of anti-nodes (A) and positions of nodes (N) of the standing wave vary depending on the frequency of the transmitted electromagnetic wave and the position of the reflection plane, that is, the position of the surface 401 of molten metal. If the position of the receiving antenna 103 which receives the electromagnetic wave is in the vicinity of a position of one of the nodes (N) of the standing wave, signal level of the electromagnetic wave will become smaller. Measures against this phenomenon will be described later.

For the transmitting antenna 101 and the receiving antenna 103, discone antennas can be used as omnidirectional antennas.

Figure 4:
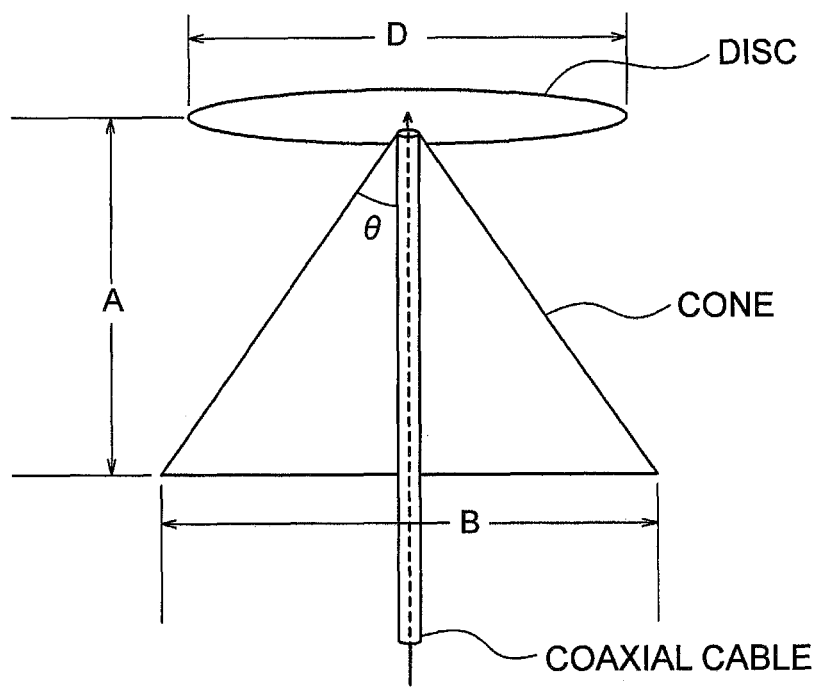
FIG. 4 shows a configuration diagram of a discone antenna.

FIG. 4 shows a configuration diagram of a discone antenna. The discone antenna consists of a disc (of diameter D), a cone (of height A and of diameter of the bottom B) and a coaxial cable.

Function of the signal processor 200 will be described in detail below.

Figure 5:
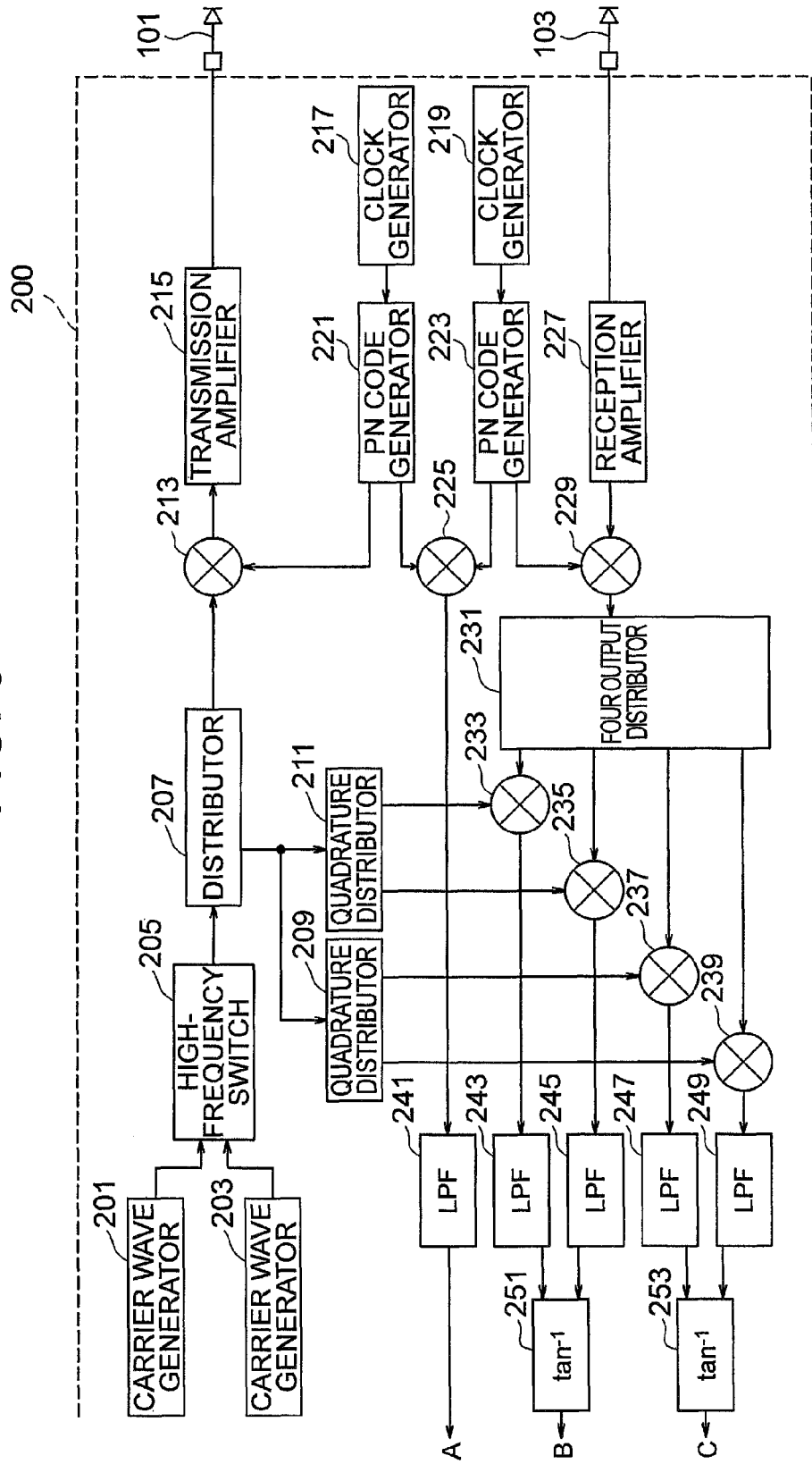
FIG. 5 shows a configuration diagram of the signal processor.
Figure 6:
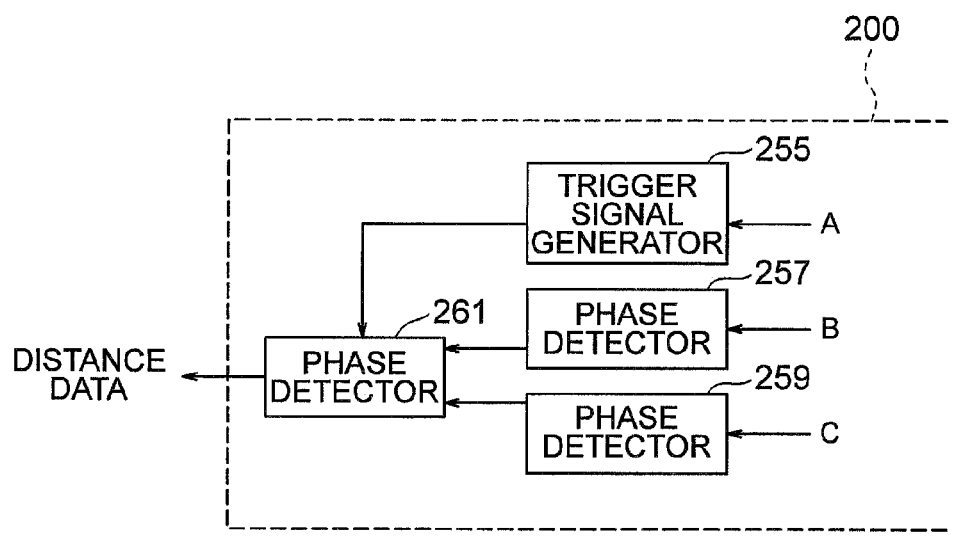
FIG. 6 shows a configuration diagram of the signal processor.

FIGS. 5 and 6 show configuration diagrams of the signal processor 200.

The signal processor 200 includes two carrier wave generators 201 and 203 for generating two kinds of carrier waves, two clock generators 217 and 219 for generating two kinds of clock signals frequencies of which slightly differ from each other, two pseudo-random signal generators (PN code generators) 221 and 223 for generating pseudo-random signals of the same pattern using the two kinds of clock signals frequencies of which slightly differ from each other, two quadrature distributors 209 and 211 for delivering quadrature components of the carrier waves, and two phase detectors 257 and 259 for obtaining phases from the quadrature components.

Carrier waves of the two kinds of frequencies generated by the two carrier wave generators 201 and 203 are alternately switched by a high-frequency switch 205 for use. For example, the two kinds of frequencies are 1 GHz and 1.7 GHz. Switching between carrier waves of the two kinds of frequencies will be described later. Carrier wave to be used is distributed by a distributor 207 such that one is to be used for transmission signal and the other is to be used for processing reception signal.

Transmission signal is generated by multiplying the carrier wave supplied by the distributor 207 by a pseudo-random signal of a first frequency generated by the PN code generator 221, with a multiplier 213. The transmission signal is amplified by a transmission amplifier 215 and then emitted by the transmitting antenna 101 as electromagnetic wave.

The electromagnetic wave received by the receiving antenna 103 is amplified by a reception amplifier 227 and then multiplied by a pseudo-random signal of a second frequency generated by the PN code generator 223, with a multiplier 229 to generate a measurement signal.

The measurement signal is divided into four signals by a four output distributor 231 and each of the four signals is multiplied by each of the quadrature components of the carrier waves of the two kinds of frequencies supplied by the quadrature distributors 211 and 209 respectively, with multipliers 233, 235, 237 and 239. The four measurement signals multiplied by each of the quadrature components pass through low pass filters 243, 245, 247 and 249 respectively and are used by angle calculators 251 and 253 to obtain phase angles. The phase angles obtained by the angle calculators 251 and 253 are delivered to phase detectors 257 and 259, respectively.

Each of the quadrature distributors 211 and 209 is used for each of the carrier waves of the two kinds of frequencies which are alternately used. Quadrature detection is not carried out for one of the carrier waves of one of the frequencies not in use.

On the other hand, the pseudo-random signal of the first frequency generated by the PN code generator 221 is multiplied by the pseudo-random signal of the second frequency generated by the PN code generator 223 with a multiplier 225. The resultant signal passes through a low pass filter 241 and is sent to a trigger signal generator 255 which generates a trigger signal. The trigger signal is also called a reference signal.

The reference signal will be described below. In the following description, pseudo-random signals are M-sequence signals and the frequencies of the first and second M-sequence signals are represented respectively by $f_{M1}$ and $f_{M2}$. By way of example, $$f_{M1} = 100.05 \text{ MHz}$$

$$f_{M2} = 100.00 \text{ MHz}$$

When a period in which the reference signal described above reaches the maximum value is represented as $T_B$, a difference between the wave number of the first M-sequence signal and that of the second M-sequence signal in $T_B$ is the wave number N in a period of the M-sequence.

$$T_B \cdot f_{M1} = T_B \cdot f_{M2} + N$$

By transforming this equation, the following equation can be obtained.

$$T_B = N/(f_{M1} - f_{M2}) \quad (1)$$

The smaller the difference between frequencies of the two M-sequence signals, the greater the period $T_B$ in which the reference signal reaches the maximum value becomes. The wave number N in a period of the M-sequence can be expressed by the following equation when the number of stages of shift registers is represented by n.

$$N = 2^n - 1 \quad (2)$$

When n=7, N=127. Further, $(f_{M1} - f_{M2})$ is as below.

$$f_{M1} - f_{M2} = 100.05 \text{ MHZ} - 100.0 \text{ MHz} = 50 \text{ kHz}$$

A period between the points at which the reference signal reaches the maximum value is referred to as a measurement cycle period. When the values described above are substituted into Equation (1), the measurement cycle period in the present embodiment is as below.

$$T_B = 127/50 \text{ kHz} = 2.54 \text{ m·sec}$$

A time period between emission and reception of carrier wave modulated by the first M-sequence signal is represented by τ while a time difference between time of occurrence of the reference signal and time of occurrence of an effective value detected in the measurement signal which has been obtained by demodulating the reception signal by the second M-sequence signal is $T_D$. Since the wave number of the second M-sequence signal generated in $T_D$ is smaller than the wave number of the first M-sequence signal generated in $T_D$ by the wave number of the first M-sequence signal generated in τ, the following equation holds.

$$T_D \cdot f_{M2} = T_D \cdot f_{M1} - \tau \cdot f_{M1}$$

By transforming the above-described equation, $T_D$ is given by the following equation.

$$T_D = \tau \cdot f_{M1}/(f_{M1} - f_{M2}) \quad (3)$$

Thus, the propagation time τ is observed as $T_D$ which is increased in time or reduced in speed by a factor of $f_{M1}/(f_{M1} - f_{M2})$.

In general, a relationship between propagation distance l of electromagnetic wave and phase difference θ in unit of radian is expressed by the following equation when wavelength is represented as λ.

$$2\pi\theta = \frac{l}{\lambda} \quad (4)$$

In the present embodiment, when a distance between the upper surface of the mold and the surface of molten metal (level of the surface of molten metal) is represented as x and a fixed length is represented as 2α, the following equation holds.

$$l = 2x + 2\alpha$$

By substituting the above-described equation into Equation (4), the following equation can be obtained.

$$x = \pi\lambda\theta - \alpha \quad (5)$$

Accordingly, if phase difference θ of electromagnetic wave which is emitted by the transmitting antenna 101, reflected on the surface of the molten metal and then received by the receiving antenna 103 is obtained, level of the surface of molten metal x can be obtained.

When a distance is obtained based on phase difference of electromagnetic wave, the distance cannot be uniquely determined unless the distance is smaller than a half of the wavelength of the electromagnetic wave. In other words, there exist two or more values of distance which correspond to two or more values of phase difference, and differences between the two or more values of distance are equal to integer multiples of the wavelength. In the present embodiment, the measurement cycle period $T_B$ is 2.54 milliseconds. On the other hand, an amount of change in level of a surface of molten metal is required to be smaller than a half of the wavelength of the electromagnetic wave of carrier wave frequency of 1.7 GHz, that is, approximately 88 mm. The rate of change in level of a surface of molten metal of 88 mm per 2.54 milliseconds corresponds to the rate of 34645 mm per second, and the rate is remarkably greater than a possible one. Accordingly, for an actual change in level of a surface of molten metal, the distance can be uniquely determined based on phase difference of the electromagnetic wave. Thus, in the present embodiment, level of a surface of molten metal can be obtained with a high accuracy by the use of phase difference.

In the signal processor 200, level of a surface of molten metal is obtained by obtaining phase differences of carrier waves of the two kinds of frequencies.

Figure 7:
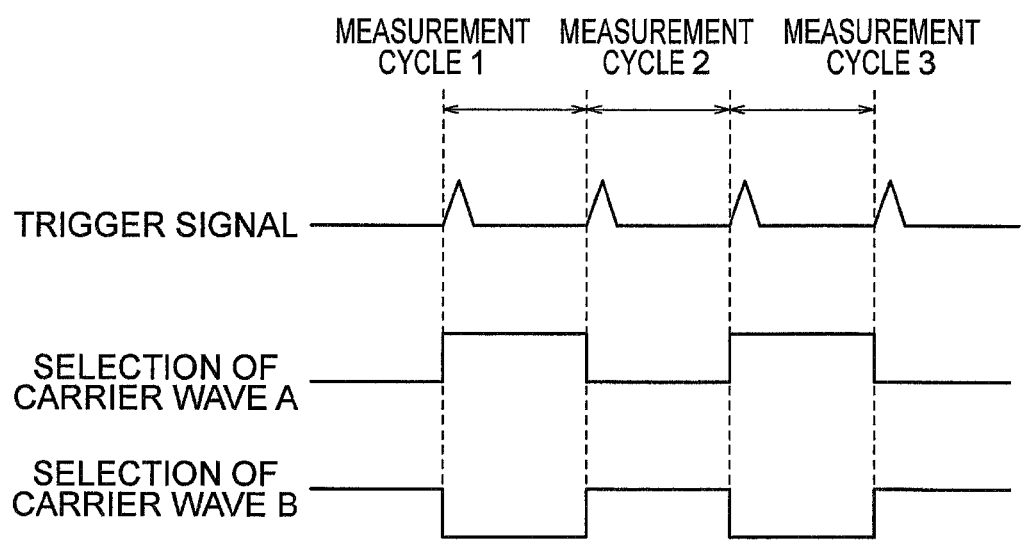
FIG. 7 shows a time diagram for illustrating switching of carrier waves.

FIG. 7 shows a time diagram for illustrating switching of carrier waves. In the present embodiment, switching between carrier waves of the two kinds of frequencies is performed by the trigger signal (reference signal) for each measurement cycle. As shown in FIG. 7, carrier wave A of frequency of 1 GHz is selected for measurement cycle 1, carrier wave B of frequency of 1.7 GHz is selected for measurement cycle 2, carrier wave A of frequency of 1 GHz is selected for measurement cycle 3, and selection described above is repeated. In each measurement cycle period, phase is obtained by one of the phase detectors 257 and 259 and distance data is finally obtained by a phase detector 261 based on the phase obtained using the selected carrier wave.

The reason why carrier waves of two kinds of frequencies are used is as below. Positions of anti-nodes and positions of nodes of the standing wave, which are formed in the space which is surrounded by the wall surfaces of the mold 303 and the surface 401 of molten metal and the upper side alone of which is not closed, vary depending on the level of the surface 401 of molten metal as shown in FIG. 3 and if the electromagnetic wave is received by the receiving antenna 103 in the vicinity of a position of one of the nodes of the standing wave, signal level of the electromagnetic wave will become smaller. In the case that carrier waves of two kinds of frequencies are alternately used, even when electromagnetic wave of one of the frequencies is received in the vicinity of a position of one of the nodes of the standing wave, electromagnetic wave of the other of the frequencies is received in a position besides positions of nodes of the standing wave, and therefore a sufficiently great signal can be obtained.

The two kinds of frequencies are selected as below. Two kinds of frequencies are selected such that they are relatively prime to each other. In the absence of a common submultiple, positions of nodes of the standing wave of one frequency do not agree with those of the standing wave of the other frequency. Further, it is preferable that positions of nodes of the first frequency come close to positions of anti-nodes of the second frequency. However, if positions of nodes of the first frequency agree with positions of anti-nodes of the second frequency, a common submultiple must exist. Further, even when the two kinds of frequencies have a common submultiple, there will be no problem if positions of nodes of the first frequency do not agree with positions of nodes of the second frequency in the measuring range in the mold.

An experiment of measurement with the apparatus for measuring a level of molten metal according to an embodiment of the present invention will be described below. The experiment was performed using a virtual mold which has a hole a cross section of which is of a square with a side of length of 140 mm and depth of which is 600 mm. A metal plate was used as a surface of molten metal. The two kinds of frequencies of carrier waves, the first frequency $f_{M1}$ and the second frequency $f_{M2}$ of M-sequence signals, and the wave number N in a period of the M-sequence are identical those described above. The transmitting antenna and the receiving antenna were installed on the upper surface of the mold such that they are opposite each other in a horizontal plane as shown in FIG. 1.

Figure 8:
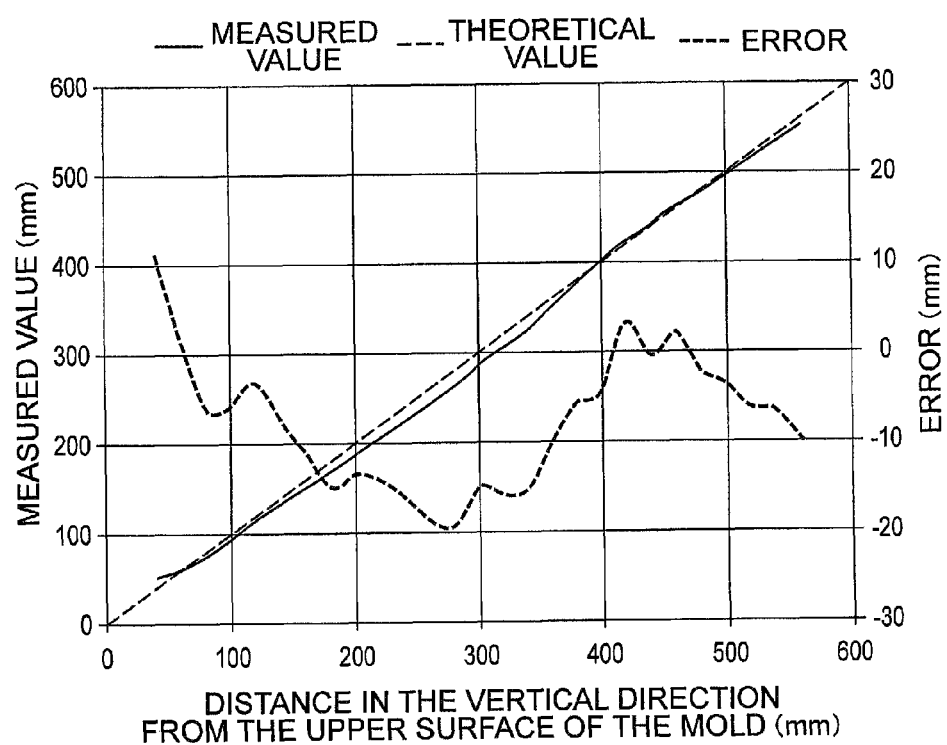
FIG. 8 shows results of the experiment of measurement with the apparatus for measuring a level of molten metal according to the embodiment of the present invention.

FIG. 8 shows results of the experiment of measurement with the apparatus for measuring a level of molten metal according to the embodiment of the present invention. The horizontal axis in FIG. 8 indicates distance in the vertical direction from the upper surface of the mold. The vertical axis in FIG. 8 indicates theoretical value, measured value and error. Theoretical value corresponds to a position of the actual surface of molten metal (the metal plate). The scale on the left side along the vertical axis in FIG. 8 indicates theoretical value and measured value. The scale on the right side along the vertical axis in FIG. 8 indicates error of measured value with respect to theoretical value. While distance of the surface of molten metal (the metal plate) from the upper surface of the mold varies in a range between 50 mm and 550 mm, error of measured value remains within a range between −20 mm and +10 mm.

Since the apparatus for measuring a level of molten metal according to the embodiment of the present invention uses electromagnetic wave in ultra-high frequency range (300 MHz to 3 GHz), the structure of the apparatus is more simple compared with that of an apparatus using electromagnetic wave of a higher frequency. Further, since the apparatus for measuring a level of molten metal according to the embodiment of the present invention uses omnidirectional antennas, the apparatus is highly robust against a change in level at a local portion of the surface of the molten metal.

What is claimed is:

1. An apparatus for measuring a level of molten metal which measures a level of molten metal in a mold, comprising:
    an omnidirectional transmitting antenna;
    an omnidirectional receiving antenna; and
    a signal processor,
    wherein the omnidirectional transmitting antenna and the omnidirectional receiving antenna are installed at a level which is higher than a surface of molten metal in the direction which is parallel to the surface of molten metal such that they are opposite each other, and
    wherein the apparatus measures the level of molten metal in the mold using an electromagnetic wave emitted into the mold by the omnidirectional transmitting antenna, and
    wherein the apparatus measures the level of molten metal in the mold by detecting a phase difference between an electromagnetic wave transmitted by the transmitting antenna and an electromagnetic wave received by the receiving antenna.

2. An apparatus for measuring a level of molten metal according to claim 1, wherein the apparatus uses electromagnetic waves of two kinds of frequencies in the ultra-high frequency range.

3. An apparatus for measuring a level of molten metal according to claim 1, wherein the apparatus is constructed such that a signal to be emitted by the transmitting antenna is modulated by a first pseudo-random signal of frequency $f_{M1}$, a signal received by the receiving antenna is demodulated by a second pseudo-random signal of frequency $f_{M2}$ ($f_{M2}<f_{M1}$), the first and second pseudo-random signals have an identical pattern, and measurement of the level of molten metal is performed in each measurement cycle period $T_B$ which is determined by $$T_B = N/(f_{M1} - f_{M2})$$

where N represents wave number in a period of the pseudo-random signals.

4. An apparatus for measuring a level of molten metal according to claim 3, wherein the apparatus alternately uses electromagnetic waves of two kinds of frequencies by switching for each measurement cycle period $T_B$.

5. A method for measuring a level of molten metal by which a level of molten metal in a mold is measured, comprising the steps of:
    emitting an electromagnetic wave by an omnidirectional transmitting antenna;
    receiving an electromagnetic wave reflected on the surface of molten metal by an omnidirectional receiving antenna; and
    obtaining, by a signal processor, a phase difference between the electromagnetic wave transmitted by the omnidirectional transmitting antenna and the electromagnetic wave received by the omnidirectional receiving antenna to obtain the level of the surface of molten metal,
    wherein the omnidirectional transmitting antenna and the omnidirectional receiving antenna are installed at a level which is higher than a surface of molten metal in the direction which is parallel to the surface of molten metal such that they are opposite each other.

6. An apparatus for measuring a level of molten metal according to claim 1, wherein the apparatus measures the level of the molten metal in the mold using an electromagnetic wave in the ultra-high frequency range.

7. A method according to claim 5, wherein the emitting the electromagnetic wave comprises emitting the electromagnetic wave in the ultra-high frequency range.

* * * * *